US012570430B2

(12) United States Patent
Hoefte

(10) Patent No.: US 12,570,430 B2
(45) Date of Patent: Mar. 10, 2026

(54) LID CORNER WITH INTERNAL LAYER CUTOUT SHAPE

(71) Applicant: The Procter & Gamble Company, Cincinnati, OH (US)

(72) Inventor: Paulus Antonius Augustinus Hoefte, Astene (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/544,520

(22) Filed: Dec. 19, 2023

(65) Prior Publication Data

US 2024/0199270 A1 Jun. 20, 2024

(30) Foreign Application Priority Data

Dec. 19, 2022 (EP) .................................... 22214415

(51) Int. Cl.

| | |
|---|---|
| ***B65D 5/44*** | (2006.01) |
| ***B31B 50/14*** | (2017.01) |
| ***B31B 50/28*** | (2017.01) |
| ***B31B 100/00*** | (2017.01) |
| ***B31B 110/35*** | (2017.01) |
| ***B31B 120/10*** | (2017.01) |
| ***B31B 120/40*** | (2017.01) |
| ***B65D 5/20*** | (2006.01) |
| ***B65D 5/64*** | (2006.01) |

(52) U.S. Cl.

CPC ............ *B65D 5/443* (2013.01); *B31B 50/142* (2017.08); *B31B 50/28* (2017.08); *B65D 5/20* (2013.01); *B65D 5/64* (2013.01); *B31B 2100/00* (2017.08); *B31B 2110/35* (2017.08); *B31B 2120/102* (2017.08); *B31B 2120/40* (2017.08)

(58) Field of Classification Search

CPC ........ B65D 5/64; B65D 5/20; B65D 2205/02; B65D 5/443

USPC ..................... 206/1.5; 229/930, 931.1, 198.2

See application file for complete search history.

(56) References Cited

U.S. PATENT DOCUMENTS 3,178,093 A 4/1965 Wasyluka
3,734,392 A 5/1973 Clark
6,824,042 B2 * 11/2004 Chu ....................... B65D 5/307 229/198.2
2015/0329277 A1 * 11/2015 Dijkstra .................. B65B 23/02 53/415
2023/0264852 A1 * 8/2023 Hoefte ..................... B65D 5/38 206/1.5

FOREIGN PATENT DOCUMENTS

FR 3083781 A1 1/2020
JP H08244754 A 9/1996
JP 3043967 U 12/1997

(Continued)

OTHER PUBLICATIONS

EPO Search Report and Opinion for Application No. 22214415.6; dated Aug. 28, 2023, 12 pages.

(Continued)

*Primary Examiner* — Orlando E Aviles
*Assistant Examiner* — Sanjidul Islam
(74) *Attorney, Agent, or Firm* — Abigail O. Idokogi; Andrew J. Mueller

(57) ABSTRACT

Disclosed here is a container that includes a box, a lid, and a lock.

15 Claims, 6 Drawing Sheets

FIG. 3B

(56) References Cited

FOREIGN PATENT DOCUMENTS

| | | | |
|---|---|---|---|
| JP | 2005187010 | A | 7/2005 |
| JP | 2005313903 | A | 11/2005 |
| JP | 2010023884 | A | 2/2010 |
| JP | 2010240981 | A | 10/2010 |
| JP | 2011251748 | A | 12/2011 |
| JP | 2013224171 | A | 10/2013 |
| WO | 2016077450 | A1 | 5/2016 |

OTHER PUBLICATIONS

EPO Search Report and Opinion for 23217853.3 dated May 15, 2024, 5 pages.

* cited by examiner

FIG. 4A
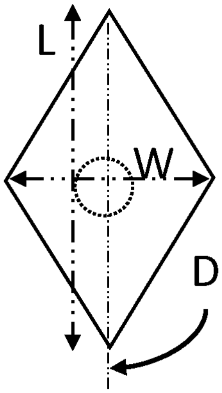
FIG. 4B
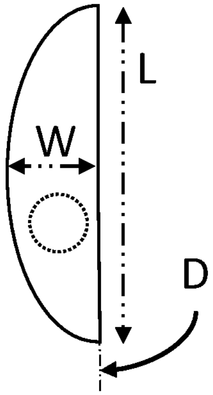
FIG. 4C
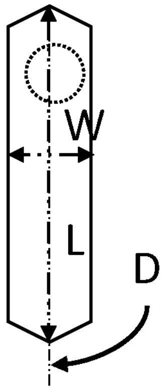
FIG. 4D
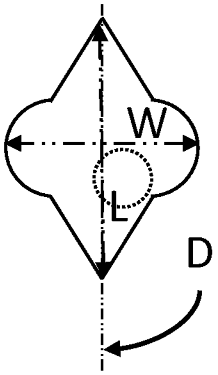
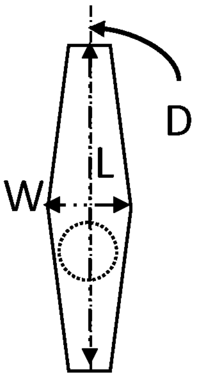
FIG. 4E
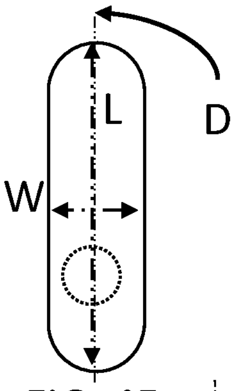
FIG. 4F
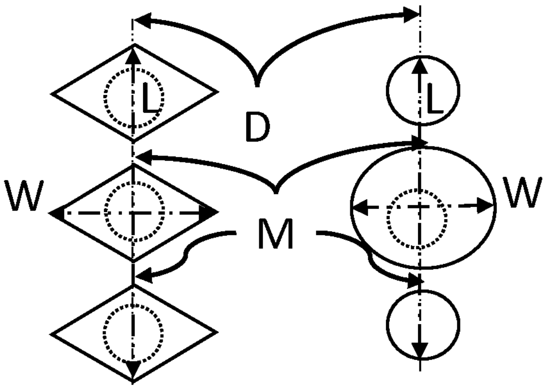
FIG. 4G
FIG. 4H
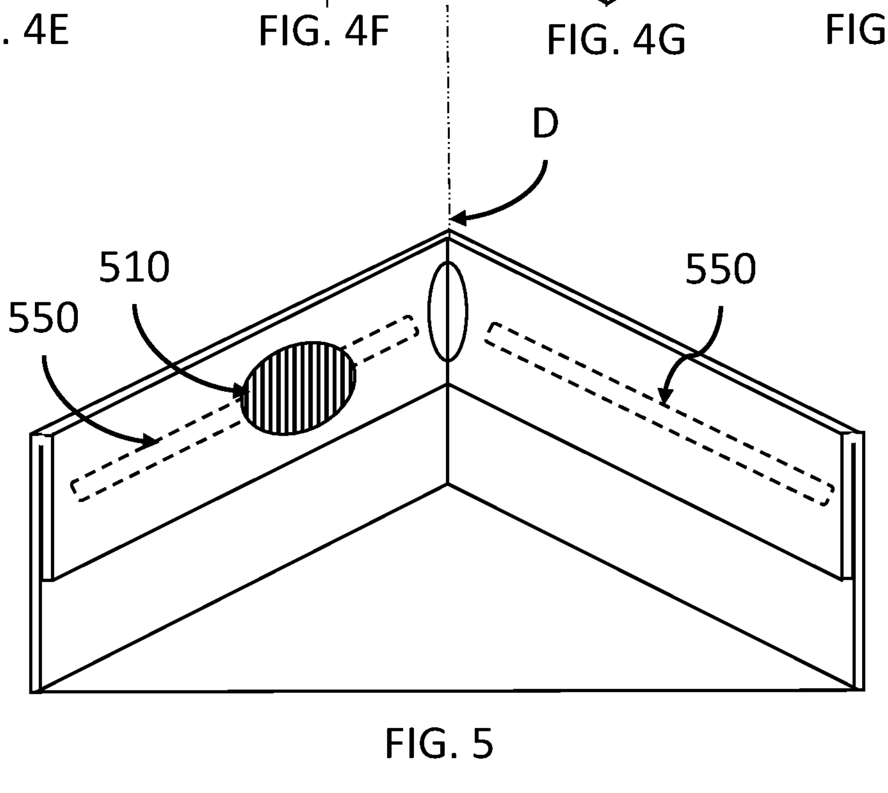
FIG. 5

LID CORNER WITH INTERNAL LAYER CUTOUT SHAPE

The present disclosure relates to cardboard or paperboard containers.

BACKGROUND

This invention generally relates to packaging using paperboard or cardboard material. Paperboard or cardboard is a widely used packaging material which is particularly suited for recycling, in particular recycling in a paper recycling stream which may involve a reduced non fiber content, for example a maximum non fiber content of 5% by weight, and thereby particularly environmentally friendly. Paperboard or cardboard has however limitations compared to other packaging materials such as plastic materials, in particular as far as mechanical characteristics are concerned. FR3083781A1 discloses a blank for forming a transport box and box formed by said blank. U.S. Pat. No. 3,734,392A discloses a multiwall container. U.S. Pat. No. 3,178,093A discloses a reinforced container. WO2016077450A1 discloses a carrier and blank therefore.

SUMMARY

The invention is set out in the appended claims.

BRIEF DESCRIPTION OF THE DRAWINGS

FIG. 3C-D illustrate example containers and consumer products.

FIG. 4A-H illustrate example cutout shapes.

FIG. 5 illustrates another example corner.

DETAILED DESCRIPTION

Figure 1A:
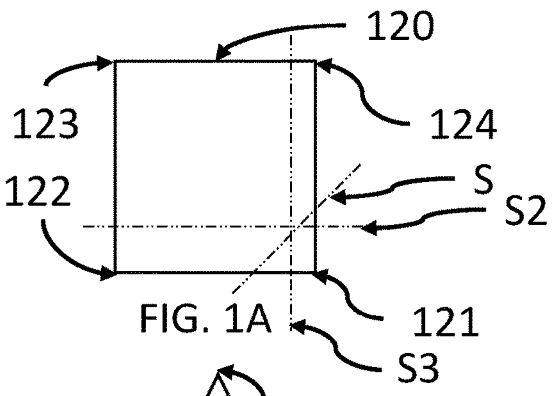
FIG. 1A-E illustrate example containers and consumer products.

A lid is an important structural element of a container. This disclosure focuses on providing a container having a lid which may reliably get manufactured and may maintain its structural integrity over time. More specifically, lid corners are likely to be subjected to shocks or to tensions which can lead to deteriorating the desired structural integrity of a lid. While an accumulation of reinforcement layers may be considered to reinforce a lid corner, such accumulation can in turn generate mechanical tensions within a corner structure, whereby an internal layer nested in another external layer may generate a tension leading to weakening or even breakage or tearing of the external layer. Such tension is particularly increased in situations where reinforced layers are attached to each other prior to forming the corner structure concerned, whereby outside layers will be submitted to a radius of curvature larger than inside layers nested into the outside layers, without possibility to slide onto each other to spread the resulting elongation beyond an attachment point. While a controlled preliminary weakening of the nested internal layer may release some of the tension, it was found that a controlled preliminary weakening solely by fold line, partial cuts or cut throughs was not sufficient. Weakening of a nested internal layer by cutting off and removing material was however found to release sufficient tension to avoid damaging an external layer attached to the internal layer. Such cutout removal was however found to generate issues on a lid manufacturing line due to an accumulation of minute cutout pieces on such line, leading to negatively impacting manufacturing line speed or even to stopping of a manufacturing line. Examples of cutout shapes according to this disclosure were found to provide reinforced multilayer lid corners which not only addressed risks of lid deterioration but also addressed issues on a manufacturing line, for example in an industrial die-cutting machine at a carton convertor, and also increased reliability and precision in the forming of the lids concerned, more generally during carton forming, at a filling line and when used by an end user. More specifically, such cutout shapes permitted resolving multiple issues, such as precision and predictability of positioning of a corner segment, releasing of tension onto an external layer, avoidance of high bending forces risking an undesired flap folding, and avoidance of accumulation of cutout debris on a manufacturing line.

Paperboard or cardboard is, mechanically speaking, a relatively flexible material, meaning that a wall of a container made of paperboard or cardboard may offer little resistance to getting bent under an external pressure. In some applications where resistance to getting bent and/or high tear resistance is of importance, a material different from paperboard or cardboard may be used. Materials different from paperboard or cardboard may however not be as straightforward to recycle. Such choice of material thereby results of a compromise. An objective of the present disclosure is to propose a container comprising a lid, whereby the inclusion of a reinforced lid corner leads to reinforcement of the whole container structure, permitting use of paperboard or cardboard in applications which would otherwise be compromised by using another material.

As the container according to this description may be shaped using folding machinery which is likely to be already in place at a manufacturing location, little or no additional capital is required at a manufacturing location to implement the structures according to this disclosure.

A lid, box or container according to this disclosure may be made from paper material wherein the paper material is for example selected from paperboard, cardboard, laminates comprising at least one paper board or cardboard layer. Paperboard or cardboard comprise cellulose fibre materials or a mixture thereof. The material used to make the lid, box or container may comprise other ingredients, such as colorants, protective varnishes, surface enhancement coatings, barrier coatings, preservatives, recycled fibre materials, plasticisers, UV stabilizers, oxygen barriers, perfume barriers, and moisture barriers, or a mixture thereof. In some examples, in order to provide a desired tear resistance and strength, cellulose fibres lengths is in a range from 0.1 to 5 mm, preferably from 1 to 3 mm. In some examples, cellulose fibres are sourced from various sources such as virgin soft or hard woods, hemp, grass, corn, bagasse, sugarcane, bamboo and others, and/or from post producer or post consumer recycled paper and cardboard.

The lid, box or container may comprise areas of external or internal printing. The lid, box or container may be made for example by cardboard making. Suitable lid, box or container manufacturing processes may include, but are not limited to, tube forming from a flat cardboard or paperboard sheet with a gluing step, folding, or a mixture thereof. The lid, box or container may be opaque or filter some specific wavelengths, for example to protect content from external light. In some examples the lid, box or container is constructed at least in part and in some specific examples in its entirety from paper-based material. By paper-based material, we herein mean a material comprising paper. Without wishing to be bound by theory, by 'paper' we herein mean a material made from a cellulose-based pulp. Paperboard may be made from a paper-based material having a thickness and rigidity such that it does not collapse under its own weight. While paperboard should be understood as comprising a single layer of material, cardboard should be understood as comprising a plurality of paper-based material layers. In some examples, the paper-based material comprises paperboard, cardboard, or a mixture thereof, wherein preferably, cardboard comprises paperboard, corrugated fiber-board, or a mixture thereof. Corrugated fiber-board comprises a series of flutes. Each flute can be understood to be a channel. The flutes run parallel to one another, with the flute direction being the direction travelled along each channel. The paper-based material may be a laminate comprising paper, cardboard, or a mixture thereof, wherein in some examples, cardboard comprises paperboard, corrugated fiber-board, or a mixture thereof, and in some examples at least another material. In some examples, the at least another material comprises a plastic material. In some examples, the plastic material comprises polyethylene, more specifically Low Density PolyEthylene (LDPE), polyethylene terephthalate, polypropylene, polyvinylalcohol or a mixture thereof. In some examples the plastic material comprises a copolymer from an ethylene starting monomer and vinyl alcohol, or EVOH. A barrier material may be used as the at least another material. The barrier material may be a biaxially orientated polypropylene, a metallised polyethylene terephthalate, or a mixture thereof. The at least another material may comprise a wax, a cellulose material, polyvinylalcohol, silica dioxide, casein based materials, or a mixture thereof. In some examples, the paper-based laminate comprises greater than 50%, preferably greater than 85%, and more preferably greater than 95% by weight of the paper based laminate of fiber-based materials. In some examples, the barrier material may comprise plastic material having a thickness of between 10 micron and 60 micron. In some examples, the barrier material may comprise plastic material having a thickness of between 10 micron and 35 micron. The paper-based material may be a laminate. In some examples, the internal surface of a lid, box or container comprises paperboard, cardboard, or a mixture thereof, wherein, in specific examples, cardboard comprises paperboard, corrugated fiber-board and lamination of polyethylene, especially LDPE, or a mixture thereof, and, in some examples, the external surface of the lid, box or container or a combination thereof comprises the at least another material. Alternatively, the at least another material might also be laminated in-between two paper-based material layers such as the paperboard or cardboard layers as per this disclosure. Without wishing to be bound by theory this at least another material might act as a barrier for leaked liquid absorbed by the paper-based material facing the interior side of the lid, box or container, to prevent or reduce a contaminating flow through a wall of the lid, box or container. Other structures may be found efficient to avoid leakage from the content or to protect the content from external fluids, for example from a shower, a sink, or by handling the container or the lid with wet hands. Contamination of a wall of the lid, box or container might be unsightly to consumers or may contaminate the storage area. In some examples, the lid, box or container are made of a paper-based material comprising the at least another material laminated in between two corrugated fiberboard layers. In some examples, the material used for the lid, box or container comprises a core cardboard flute material sandwiched between two plain cardboard (or paperboard) layers and polyethylene laminate. A paperboard or cardboard layer according to this disclosure may be made from or comprise recycled material or recycled cellulose fibres. The external surface of the lid, box or container may comprise a coating or a varnish. Such a coating or varnish can help making a board repellent to water or help protecting a content such as an enclosed detergent composition from UV light. The coating or varnish could also help protecting the external surface of the lid, box or container from being contaminated by the content, for example an enclosed detergent composition, for example if leakage of a water-soluble unit dose detergent enclosing a liquid detergent composition would occur.

A coating or vanish on the internal surface can help to prevent the content to stick to the inner surface or prevent migration of inks, colorants, perfumes, non-ionics, oils, greases and other ingredients from the content into the board or inks or additives from the board onto the content. In some examples detergent resistant varnishes or coatings can be applied on areas exposed to the contents.

Figure 1B:
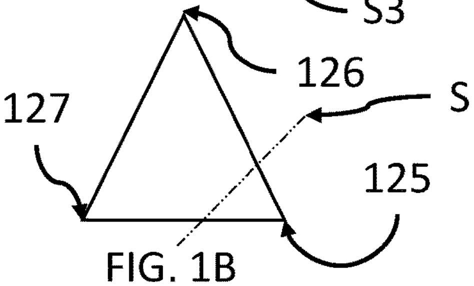
Figure 1C:
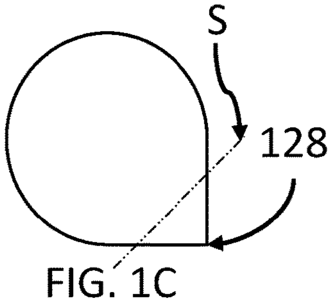
Figure 1D:
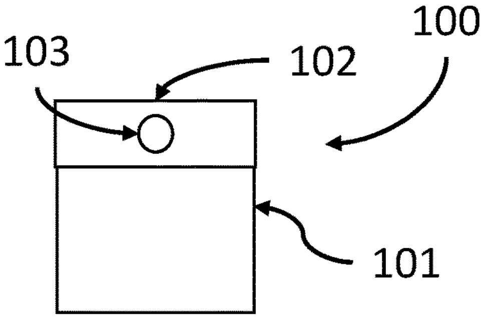
Figure 1E:
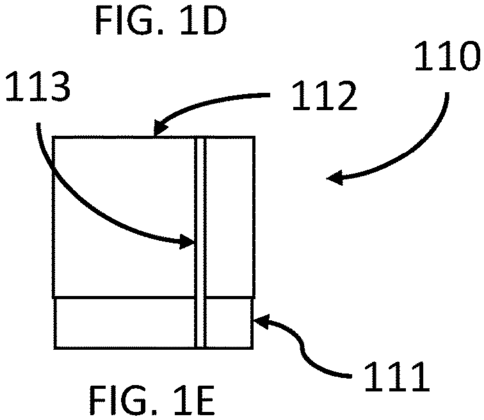

FIG. 1A-C illustrate different example containers in a top view. FIGS. 1D and E illustrate different example containers in a side view. As illustrated, containers according to this disclosure may take numerous shapes. In an example, a cubical container corresponds to FIGS. 1A and 1D, such cubical container 100 comprising a box 101, a lid 102 for the box, and a lock 103 to maintain the lid in a closed position, the lock 103 comprising for example a generally circular actuation area. In an example, a cubical container corresponds to FIGS. 1A and 1E, such cubical container 110 comprising a box 111, a lid 112 for the box, and a lock 113 to maintain the lid in a closed position, the lock 113 comprising for example an elongated element such as a rubber band joining the lid and the box. As illustrated, the lid comprises flanks which may cover different proportions of sidewalls of the box. While the flank of lid 112 covers most of a sidewall of box 111 as illustrated in FIG. 1E, the flank of lid 102 covers a minor portion of a sidewall of box 101 as illustrated in FIG. 1D. As illustrated, the lock may be of different types. Both examples of cubical containers illustrated by FIG. 1A comprise a lid having either two corners 121 and 122 (a hinged lid hinged around edge 120, similar to the container described in FIG. 2A below), or four corners 121-124 (a lid which may be completely removed, similar to the container described in FIG. 2B below). In other examples, a container is illustrated which has a triangular cross section, whereby the top of the lid is triangular, the lid comprising 3 corners 125-127, such container corresponding either to FIGS. 1B and 1D, or, in another example, to FIGS. 1B and 1E. In further examples, a container comprising a lid having a single corner 128 is illustrated, corresponding to FIGS. 1C and 1D, or, in another example, to FIGS. 1C and 1E. While FIGS. 1A-E illustrate numerous example containers according to this disclosure, further container examples, for example hexagonal or octagonal, may be considered which are not illustrated here. Some specific example containers are discussed in more details based on FIGS. 2A and 2B.

Figure 2A:
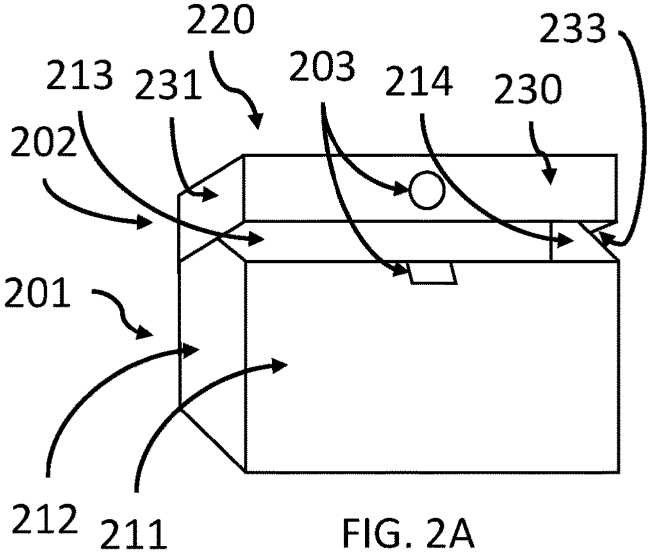
FIG. 2A-B illustrate other example containers and consumer products.
Figure 2B:
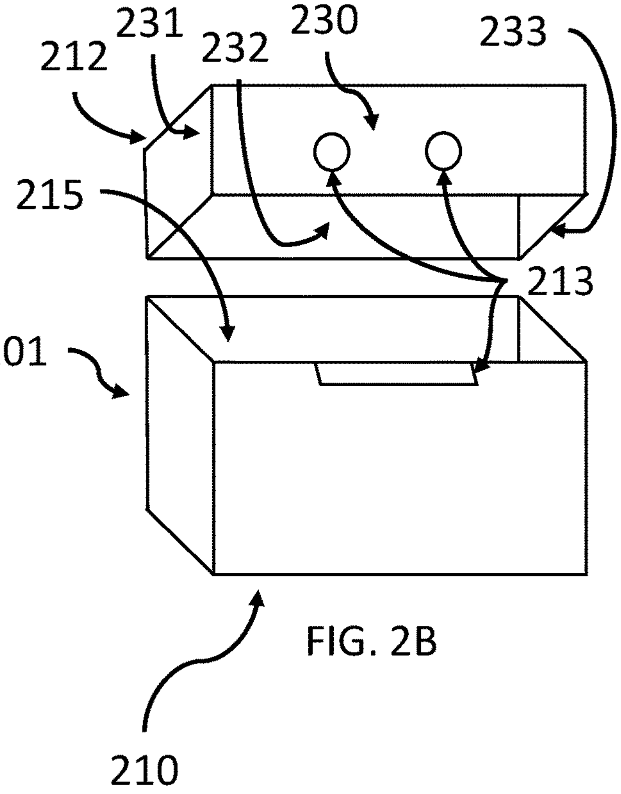

As illustrated for example in FIG. 2A or 2B, an example container should be understood in this disclosure as an object housing a content, for example in a cavity of the container. The container facilitates protection, transport, storage, access and disposal of a content, such as a consumer product. In this disclosure, the container comprises a box 201. A box should be understood for example as a generally parallelepiped, barrel shaped, cylindrical, cubical, partially round or partially oval three dimensional object defining a cavity. The use of parallelepiped boxes may facilitate storage and transportation by permitting piling up boxes in a space efficient manner. In some examples, a box may be a parallelepiped provided with some rounded, tapered trapezium or chamfered edges. The box according to this disclosure comprises for example a detergent product, but could comprise other products, in particular other moisture sensitive products. The box according to this disclosure may comprise a base 210, sidewalls 241-244 and an opening 215 opposite the base (note that in FIGS. 2A and 2B, some elements are not repeated in order to ease readability). A base according to this disclosure should be understood as a surface on which the box may lie when placed on a supporting surface such as a shelf or a floor, the opening facing up and the base facing down when in position of use, in order to maintain content in the box by gravity. In some examples, the base is flat. In some examples, the base is rectangular. In some examples, the base is oval or round. In some examples, the base has an embossed profile standing in or out in relief. The sidewalls according to this disclosure should be understood as extending from the base, and connecting the base to the opening, to a transition piece or to the lid such as hinged lid 202 of FIG. 2A or entirely removable lid 212 of FIG. 2B. It should be understood that the connection of the base to the opening may include a transition piece in addition to a sidewall. A transition piece may be glued or otherwise attached to the sidewall for example. In some examples, the sidewalls are perpendicular to the base. In some examples, the base is rectangular and has four sides, four sidewalls extending perpendicular from the base, each sidewall being rectangular, each side wall being connected by a sidewall side to a side of the base, and by two other sidewall sides to two other of the four sidewalls. In some examples, sidewalls have a shape corresponding to one of a square, a rectangle, a trapeze, a section of a sphere, a section of an ovoid, or a section of an ellipsoid. The opening according to this disclosure should be understood as an aperture providing access to a content such as, for example, a detergent product comprised in the box. In some examples, the opening has a surface of less than the surface of the base. In some examples, the opening has a surface larger than the surface of the base in order to provide an improved access, for example using sidewalls extending from the base at an angle of more than 90 degrees from the base. In some examples, the opening is provided after removal of a tamper proof feature, for example comprising a perforated piece to be removed at first use or a tamper evident sticker locking the lid to the box or tray. In some examples, the opening is placed on a top panel of the box, the top panel of the box facing the base of the box, the top panel of the box being separated from the base of the box by at least the sidewalls, the top panel of the box being generally coplanar with the base of the box, whereby the opening covers a portion of the top panel, the top panel comprising a peripheral section surrounding the opening, the peripheral section being a transition piece between a sidewall and the opening for example. In some examples, the opening is rectangular. In some examples, the opening is rectangular with rounded edges. In some examples, the opening comprises round or oval sections. The lid according to this disclosure should be understood as an element permitting to repeatedly close or open the opening of the container. In some examples the lid may be connected to the box, for example lid 202 by a hinge, or may be separated from the box such as lid 212. The lid according to this disclosure comprises a top such as top 220 for example, and flanks such as flanks 230-233 for example. It should be understood that the top of the lid is aimed at covering the opening of the box when the lid is in a closed position. In some examples, the top of the lid is rectangular. In some examples the top of the lid is polygonal, for example triangular, rectangular, square, hexagonal or octagonal. The top of the lid may also comprise round or oval sections as illustrated in FIG. 1C for example. In some examples, the lid comprises beveled edges. The lid comprises flanks. It should be understood that the flanks according to this disclosure are elements connected to the top of the lid and extending from the lid in order to engage one or more sidewalls of the box. The flanks participate in placing the top of the lid onto the opening. In some examples, the flanks extend perpendicularly from the top of the lid. In some examples, the flanks surround an entire perimeter of the top of the lid. In some examples, the flanks partially surround an entire perimeter of the top of the lid, a portion of the top of the lid being flankless, as illustrated in the case of hinged lid 202 which comprises flanks 230, 231 and 233 but does not comprise flank 232 corresponding to the hinged part of the lid. The top of the lid may cover the opening, and at least a portion of the flanks may cover at least a specific portion of the sidewalls when the lid is in the closed position, the lid being moveable from the closed position to an open position. Movement of the lid may be restrained by a connection to the box such as a hinge, or may be entirely removable, for example to provide an improved access to the content of the box. The box and lid cooperate to participate in fulfilling the role of the container to store, transport and facilitate access to the content of the container.

The container according to this disclosure comprises a lock such as one of locks 103 of FIG. 1D, 113 of FIG. 1E, 203 of FIG. 2A or 213 of FIG. 2B for example. A lock should be in this disclosure understood as a mechanism preventing or reducing the likelihood of an accidental opening. The lock according to this disclosure is to maintain the lid in a closed position. It should be understood that the lock according to this disclosure is expected to function under normal use of the container. It should be understood that the lock may not fulfill its function when for example an unusual use is made of the box, or when the box is under unusual conditions. In some examples, the lock, such as examples locks 103, 203 or 213, comprises an actuator moveable from a locking position to an opening position by applying an actuation pressure onto the actuator when the lid is in the closed position. The actuator should be understood in such examples as a mechanical structure submitted to a movement upon actuation by an outside force or actuation pressure, such movement leading to the opening of the lock when such movement takes place. In some examples, the actuator according to such examples is resilient and has a default position, such default position corresponding to the lid remaining closed, the resilience being vanquished by an outside force or actuation pressure in order to open the lid. In some examples, the actuator is resilient in that the actuator comprises a flexible element, the flexible element having a default position corresponding to the lid remaining closed, the flexible element being pressed to open the lid, the flexible element springing back to the default position when releasing pressure. It should be understood that a pressure is generated by the application of a force onto a surface. The actuator according to such examples has at least two positions being an opening position and a locking position, whereby the opening position corresponds to a position permitting opening of the lid, the locking position preventing opening of the lid or reducing the possibility of an accidental opening of the lid, for example while manipulating the container and holding the container by the lid.

An actuator, as represented for example as actuator 203 or 213 on boxes 201 of FIGS. 2A and 2B may be connected to a specific portion of sidewalls of the box, which may be a specific portion covered by at least a portion of the flanks when the lid is in the closed position, the actuator abutting against a locking tab or abutment tab of the flanks when in the locking position, the actuator being maintained away from the locking tab when in the opening position, the actuator being displaceable by the actuation pressure by an unlocking displacement distance in a direction normal to the specific portion of the sidewalls. The connection of the actuator to the specific portion of the sidewall is due to the actuator participating in locking or unlocking the specific portion of the sidewall from the portion of the flanks covering the specific portion of the sidewall, thereby permitting releasing the lid from the box. The flanks may comprise a locking tab, or abutment tab, for example formed by an internal paperboard or cardboard layer according to this disclosure. A locking tab should be understood as a mechanical element which interlocks with the actuator. In some examples the locking tab extends away from the flanks and may be in the form of a bulge, a ridge, an embossment or an additional material layer sticking out of the flanks of the lid and towards the specific portion of the side wall such that the actuator may abut against the tab when in the locking position to prevent separating the specific portion of the sidewalls from the flank in the area of the actuator. In some examples, the locking tab is comprised in the flank itself (see A in FIGS. 7A and 7B for example). Abutment according to this disclosure should be understood as a contact between the actuator or part of the actuator and the tab, such contact preventing opening of the lid. The actuator is maintained away from the locking tab when in the opening position, in order to release the locking tab. Such release of the locking tab permits opening the lid. Displacement or movement of the actuator from the locking to the opening position is by application on the actuator (directly or indirectly) of an actuation pressure or force such that the actuator is displaced by a distance sufficient to suppress contact of the actuator with the locking tab, such distance corresponding to the displacement distance, in a direction normal to the specific portion of the side wall. It should be understood that the force or pressure leading to the displacement may have a number of different directions, such different directions contributing to the displacement if a component of such force or pressure is in a direction normal to the specific portion of the side wall. Such force or pressure may also comprise a component which may be parallel to the side wall. The actuation is however triggered by a component of such force or pressure being normal to the portion of the side wall. Such presence of a component normal to the portion of the sidewall participates in the role of the lock of avoiding an accidental opening by lifting the container through lifting the lid by applying a force parallel to the sidewall, whereas desired opening would take place by the consumer "pushing" the actuator and apply the unlocking force or pressure permitting opening of the lid. In other words, while a consumer may apply a force on the actuator along a direction which may not be normal to the sidewall, if a component of such force is normal to the sidewall such component may participate in applying the pressure leading to the displacement.

Such a lock would participate in suppressing or reducing the risk of accidental opening of the lid while permitting desired opening by a consumer, the functioning of such a lock depending on ensuring that the actuator maintains abutting against the locking tab even in case of pulling strongly on the lid in a direction parallel to the side wall in order to transport or lift the consumer product. The avoidance or reduction of the risk of accidental opening would also apply to a force being applied in a direction parallel to the sidewalls for example by friction with another box located side to side with a box according to this disclosure, or by a box falling over during transportation, or by internal movements of the content of the box pushing the lid during transportation. Strong pulling in a direction parallel to the sidewall may however impact the structure of the container, for example resulting in damaging the lid corners, whereby such damage may lead to an undesired disengagement of the locking tab from the activator. This would lead to an undesired opening of the lid. Such undesired opening of the lid is less likely when using reinforced lid corners as hereby described.

In some examples, the lock is placed in a central area of a sidewall of the box. A central area should be understood as substantially equidistant from opposite edges of the sidewall concerned, such edges being along a direction normal to the base of the box. In such examples, it should be understood that the lock is located closer to an edge of the sidewall close to the opening than to an edge of the sidewall close to the base, while being in a central area in respect to the edges normal to the base. In some examples, the lock may be located on a sidewall and between two edges of the sidewall, such edges being normal to the base, the lock being closer to one edge than to the other edge of the two edges, for example located closer to the one edge at a ⅓ of the distance between the two edges. In some examples one sidewall may comprise two locks.

The content of a container according to this disclosure, such as a consumer product, for example a detergent product, are products which may be relatively heavy, in particular when the container is recently acquired and thereby holds a significant quantity of product. While some consumers may lift and transport such a container carefully by supporting the base of the box, such lifting and transport may also occur by holding such consumer product by the lid, in particular by holding distal ends of lid flanks away from the top of the lid, without holding the base. Some consumers may even hold the container by inserting fingers between lid flanks and box sidewalls. In such cases, it is possible that the lid, submitted to the force of gravity of the content of the container, be submitted to tension or even to rupture of a corner segment between such flanks of the lid, leading to accidental opening of the box, the box falling and possibly spreading its content. Such situations should be avoided. Beyond avoiding such unintentional release, the structure of the container should preserve or improve opening ergonomics and prevent or reduce a structural deformation upon excessive or repetitive application of forces applied to the container, for example during transport, in a grocery shopping bag against other objects, when submitted to external pressure, or when dropped, or to be durable to withstand multiple opening and reclosing cycles in use. At the same time, containers may be elaborated in order to preserve the environment. The container according to this disclosure aims at taking these different aspects into account.

A lid of a container comprises at least a first and a second flank, whereby the first and the second flanks intersect at a first corner segment along a corner direction normal to the top of the lid. Such corner segments may for example correspond to lid corners 121-128 of FIGS. 1A-C, to the corner between adjacent flanks 230 and 233 of FIG. 2A or 2B, to the corner between adjacent flanks 230 and 231 of FIG. 2A or 2B, to the corner between adjacent flanks 232 and 233 of FIG. 2B, or to the corner between adjacent flanks 232 and 231 of FIG. 2B. It should indeed be understood that the first and second flank are adjacent, sharing the first corner segment. In some examples, the corner is a 90 degrees corner, but in other examples the corner may be at a different angle. The first corner segment should be understood as being straight, limited at one end by the top of the lid and at another end by the distal end of the first and second flanks away from the top of the lid. Such first corner segment is along a corner direction normal to the top of the lid, which should be understood as following a direction substantially perpendicular to a plane generally aligned with the top of the lid.

Figure 3A:
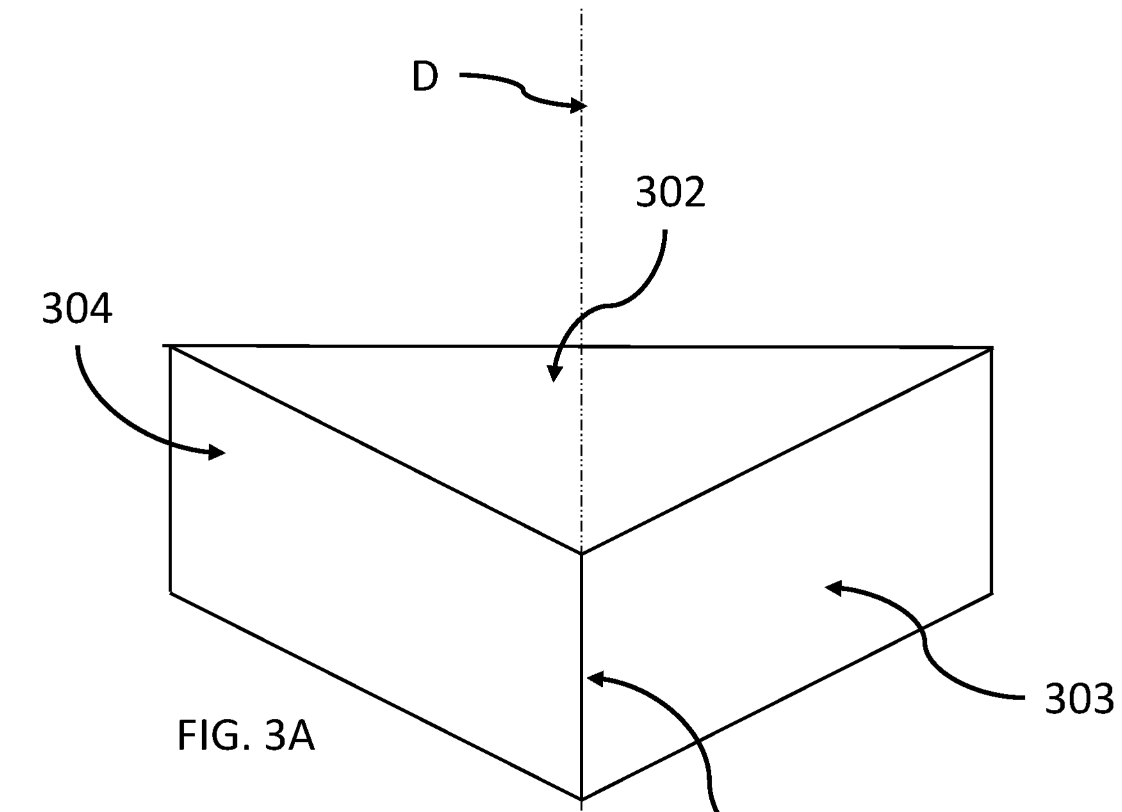
FIG. 3A-B illustrate an example corner of an example lid.
Figure 3B:
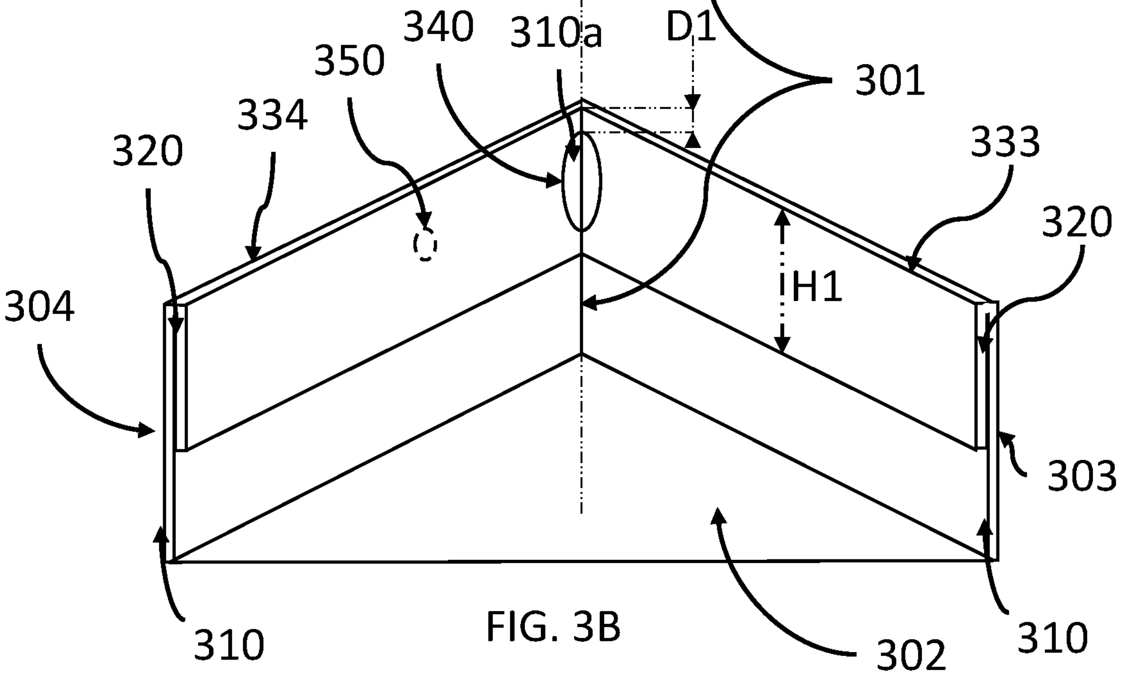

FIGS. 3A and 3B represent three dimensional cross sections views of an example lid corner according to this disclosure, for example lid corner 121, 125 or 128, the cross section being along a plane S parallel to the first corner segment 301. FIG. 3A is a view from the outside of the lid (meaning a view from outside and above the container if the lid is closed and the container lies on its base), whereas FIG. 3B is a view from the inside of the lid (the lid being in this case upside down to ease Figure readability). The lid in this example comprises top 302, first flank 303 and second flank 304.

As illustrated in FIG. 3B, the first corner segment 301 comprises a first external paperboard or cardboard layer 310 folded along the corner direction D and a first internal paperboard or cardboard layer 320 folded along the corner direction D. One should note that in other examples, one or more further layers may be provided, either nested in or overlapping the first external or the first internal layers, or sandwiched between the first external and the first internal layers. The first external layer 310 overlaps the first internal layer 320 at the first corner segment 301, whereby the first external layer is connected to the first internal layer along a first longitudinal fold line 333 parallel to the first flank 303 and along a second longitudinal fold line 334 parallel to the second flank 304, the first and the second longitudinal fold lines defining respective distal ends of the first 303 and second 304 flanks away from the top 302. Such layer overlap participates in obtaining a desired corner robustness, stiffness and/or tear resistance. One should note that the first internal layer and the first external layer may originate from a same sheet of a same material prior to being folded along the longitudinal fold lines to define the internal and external layers.

The longitudinal fold lines described hereby as parallel to a flank, such as example longitudinal fold lines 333 or 334, may in some examples also be parallel to a plane corresponding to the base, or to the top of the lid, as illustrated for example in FIG. 3A, 3B, 2A or 2B. In such situations, the longitudinal lines follow a specific direction parallel to both the flank and the top of the lid, for example. Other configurations may be considered which are not illustrated here. One should also note that the top of the lid and the base may not be necessarily parallel to each other.

As illustrated for example in FIG. 3B, the first internal layer and the first external layer are attached to each other at at least a point such as point 350 situated between the longitudinal fold lines 333 and 334 and the top of the lid. Such attachment may be obtained by one or more of gluing, heat sealing, stapling or other attachment methods. Such attachment participates in avoiding that a user may for example insert fingers between the internal and external layers. Separating the internal and external layers would indeed negatively impact corner robustness. In some examples, the point of attachment is a single point of attachment. In some examples, the first internal layer and the first external layer are attached to each other at at least two points situated between the longitudinal fold lines and the top of the lid, whereby the first corner segment is between the at least two points, thereby improving attachment between the layers. One should note that while such layers attachment on either sides of the respective corner segment promotes robustness, such attachment further limits flexibility of the corner structure, thereby further benefitting from the introduction of the cutout as per this disclosure.

As illustrated in FIG. 3B, the first external layer 310 is a continuous layer at the first corner segment whereas the first internal layer comprises a first cutout shape 340 at the first corner segment. In this example, no layers are present between the first external layer and the first internal layer, such that part 310*a* of the first external layer is visible through cutout 340. Such cutout shape is defined by a perimeter corresponding to material removed from the first internal layer, such removal of material leading to releasing pressure in the corner area, avoiding or reducing a risk of damaging the first external layer in such area. A continuous layer should be understood as a layer forming an unbroken whole in the corner area, in other words a layer which is uninterrupted by a cutout. In some examples, the continuous first external layer comprises uninterrupted fibres which comprise both a fibre portion comprised in the first flank and another fibre portion of a same fibre in the second flank, such uninterrupted fibres of the external paperboard or cardboard layer bridging the cutout shape in the internal paperboard or cardboard layer, thereby providing corner robustness.

As illustrated in FIG. 3B, the first cutout shape 340 is elongated along the first corner segment, i.e. along direction D. Such elongation has the effect of facilitating the folding along such direction D to form the corner. One should note that the elongation should be understood in that the overall cutout shape has a maximum length along the corner direction D longer than a maximum width along the directions perpendicular to the corner direction D. One should note that due to the folding, the cutout may have a resulting three dimensional shape. While cutout 340 is represented as having a generally elliptical or oval shape, other shapes may be considered, as illustrated for example in FIGS. 4A-H. In FIGS. 4A-H, the cutout shapes are represented flat, and they may indeed be produced or manufactured from a flat sheet corresponding to the paperboard or cardboard layers, but such cutout shapes will take a three dimensional shape once folded along the corner direction D to form the corner. Some cutout shapes, such as example shape represented in 4B may maintain a two-dimensional shape as they will remain on a single one of the two flanks, while being adjacent to the corner segment. In FIG. 4A, the cutout shape is a diamond shape elongated in the corner direction D. In FIG. 4B, the cutout shape is a half elliptical shape elongated in the corner direction D. In FIG. 4C, the cutout shape is a hexagonal shape elongated in the corner direction D. In FIG. 4D, the cutout shape is a combination of curves and polygons producing a shape elongated in the corner direction D. In FIG. 4E, the cutout shape is another hexagonal shape elongated in the corner direction D. In FIG. 4F, the cutout shape is a combination of a rectangle and a disk producing a shape elongated in the corner direction D. In FIG. 4G, the cutout shape is a combination of diamond sections producing an overall or resulting shape elongated in the corner direction D. In FIG. 4H, the cutout shape is a combination of bead or round sections producing an overall or resulting shape elongated in the corner direction D. One should note that each of the shapes has a maximum width W, along a direction perpendicular to direction D, which is less than their maximum length L along direction D. In some examples, the cutout shape maximum width W, along a direction perpendicular to corner direction D, is less than 90% of the cutout maximum length L along corner direction D. In some examples, the cutout shape maximum width W, along a direction perpendicular to corner direction D, is less than 70% of the cutout maximum length L along corner direction D. In some examples, the cutout shape maximum width W, along a direction perpendicular to corner direction D, is less than 50% of the cutout maximum length L along corner direction D. In some examples, the cutout shape maximum width W, along a direction perpendicular to corner direction D, is less than 30% of the cutout maximum length L along corner direction D. In some examples, the cutout shape maximum width W, along a direction perpendicular to corner direction D, is less than 10% of the cutout maximum length L along corner direction D. One should note that while the length L remains linear once folded, the width W can be formed of two segments once folded (one segment along the first flank, another along the second flank). One should note that in case of a cutout shape formed from different sections separated from each other (see FIG. 4G or 4H for example), the overall maximum length and overall maximum width are taken into account to define elongation, including material sections such as sections M of FIGS. 4G and 4H between cutout sections. In some examples, a cutout shape formed from different sections separated from each other is associated to a relatively long corner segment. While a cutout shape comprising different sections separated from each other is represented here as having the different sections spread along the corner direction D, other configurations may be considered. In some examples, the first cutout shape comprises one or more of an ellipse, an oval, a diamond, a half moon, an elongated bead, or a superposition of any of these. One should note that in some examples, the first cutout shape comprises one or more of an apex or a vertex coinciding with the first corner segment (see for examples cutout shape 340 of FIG. 3B, or cutout shape represented in FIGS. 4A, 4B, 4C, 4D, 4F, 4G and 4H), such a configuration promoting precision in defining the corner direction D along which the corner will be shaped. In some examples, an apex or vertex is provided on opposite sides of the cutout shape along the corner direction D, for example to contribute to guiding the folding along such corner direction D. In some examples, the cutout shape is symmetrical in reference to a plane normal to the corner direction D.

The first cutout shape according to this disclosure terminates more than 0.5 cm away from the first and second longitudinal fold lines. In other words, a point of the cutout shape closest to either one of the first or second longitudinal fold lines is separated from such fold lines by a distance, such as distance D1 of example cutout 340, of at least 0.5 cm. Such a minimal distance permits benefiting from the effects of the cutout in reducing tension while limiting an impact on corner robustness. In some examples, the first cutout shape terminates more than 0.7 cm away from the first and second longitudinal fold lines. In some examples, the first cutout shape terminates more than 1 cm away from the first and second longitudinal fold lines. In some examples, the first cutout shape terminates more than 1.5 cm away from the first and second longitudinal fold lines. One should note that in some examples, the point of the cutout shape closest to either one of the first or second longitudinal fold lines is an apex or vertex of the cutout shape coinciding with the first corner segment, providing corner robustness and increased precision in folding. In some examples, the first cutout shape terminates less than 3 cm away from the first and second longitudinal fold lines in order to cutout a sufficient amount of material.

In some examples, the first cutout shape according to this disclosure terminates more than 0.5 cm away from the top of the lid, in order to further increase robustness. In some examples, the first cutout shape terminates more than 0.7 cm away from the top. In some examples, the first cutout shape terminates more than 1 cm away from the top. In some examples, the first cutout shape terminates more than 1.5 cm away from the top. In some examples, the first cutout shape terminates less than 3 cm away from the top in order to cutout a sufficient amount of material.

The first cutout shape according to this disclosure has a maximum total span, along the first and second flanks and in a plane parallel to the top, of at least 0.3 mm, preferably of at least 2 mm. Such maximum total span is for example also illustrated as width W in FIGS. 4A-H. Providing such maximum total span permits facilitating the removal of the material cutout during manufacturing, in particular using a pin, whereby the pin may be inserted in the cutout material to permit removal of such cutout material from a manufacturing line, for example from and industrial die-cutting machine at high speed, avoiding accumulation of cutout material debris which would otherwise negatively impact manufacturing productivity. In some examples, the first cutout shape according to this disclosure has a maximum total span, along the first and second flanks and in a plane parallel to the top, of at least 3 mm. In some examples, the first cutout shape according to this disclosure has a maximum total span, along the first and second flanks and in a plane parallel to the top, of at least 4 mm. In some examples, the first cutout shape according to this disclosure has a maximum total span, along the first and second flanks and in a plane parallel to the top, of at least 5 mm. In some examples, the first cutout shape according to this disclosure has a maximum total span, along the first and second flanks and in a plane parallel to the top, of at least 6 mm. In some examples, the first cutout shape according to this disclosure has a maximum total span, along the first and second flanks and in a plane parallel to the top, of less than 1 cm in order to cutout a sufficient amount of material while maintaining structural rigidity. As described above in the context of width W, the span can be formed of two segments once folded (one segment along the first flank, another along the second flank). In some examples, such span is in function of the internal layer thickness, whereby a thicker internal layer benefits from a wider, or higher span, cutout, in order to release an increased tension corresponding to a thicker layer. In some examples a 0.3 to 1 mm span is used for a plainboard (not corrugated) layer. In some examples a 1 to 4 mm span is used for a corrugated layer. In some examples a 0.8 to 1.2 mm span is used for an N (0.5 mm) flute layer. In some examples a 1 to 1.5 mm span is used for an F (1 mm) flute layer. In some examples a 1.5 to 2 mm span is used for an E (1.5 mm) flute layer. In some examples a 3 to 4 mm span is used for a B (3 mm) flute layer.

The first cutout shape according to this disclosure has a length, corresponding to length L in FIGS. 4A-H, of less than 90% and of more than 10% of a height, such as example height H1 of FIG. 3B, of the first internal layer along the first corner segment. This permits benefiting from the effect of the cutout without significantly impacting robustness of the first internal layer along the first corner segment. In some examples, the first cutout shape according to this disclosure has a length of less than 80% and of more than 20% of a height of the first internal layer along the first corner segment. In some examples, the first cutout shape according to this disclosure has a length of less than 70% and of more than 30% of a height of the first internal layer along the first corner segment.

In some example, the first cutout shape extends beyond a 2 mm diameter profile. As discussed in the context of width W and of the cutout shape maximum total span, while such 2 mm diameter may correspond to a removed disk of material when the cutout is manufactured, such removed disk of material may take a three dimensional shape when the corner gets formed. such 2 mm diameter profile is represented by a dashed line disk in FIGS. 4A-H. Such extension beyond a 2 mm diameter profile can permit capturing the cutout material with a pin during manufacturing of the cutout, the pin having a diameter of less than the diameter profile, such capturing of the cutout material permitting removal of such cutout material. In some examples, cutout material may be removed by alternative ways, for example by blowing, although such an alternative way may provide less control on the removal. In some examples, the first cutout shape extends beyond a 3 mm diameter profile. In some examples, the first cutout shape extends beyond a 4 mm diameter profile. In some examples, the first cutout shape extends beyond a 5 mm diameter profile. Providing a larger extension in this manner facilitates pinning and controlled removal of the cutout material. In some examples whereby the cutout shape comprises a plurality of separated cutout sections, each cutout section extends beyond a 2 mm, 3 mm or 4 mm diameter profile such that each section may be pinned. In some examples whereby the cutout shape comprises a plurality of separated cutout sections, each cutout section extends within a 30 mm diameter profile such that the internal layers retains robustness. In some examples whereby the cutout shape comprises a plurality of separated cutout sections, each cutout section extends within a 1 cm diameter profile such that the internal layers retains robustness while avoiding unintentionally catching fingers of a user.

In some examples, in particular as illustrated in FIG. 5, which is based on the example represented in FIG. 3B and as a view along a plane such as plane S, the first external layer and the first internal layer comprise corrugated cardboard as illustrated in broken off section 510, the corrugated cardboard comprising flutes, the flutes running parallel to the corner direction D. Such a configuration was found to be particularly robust, while facilitating the forming of the corner. One should note that such a configuration was found particularly suited to the first cutout shape comprising one or more of an apex or a vertex coinciding with the first corner segment, in order to provide precision in corner forming in cases where the flutes may not be exactly aligned with the corner direction and may tend to shift the fold line and offset such resulting fold line from the desired corner direction.

As illustrated in FIG. 5, the first internal layer and the first external layer may be attached to each other along at least two attachment segments 550 situated between the longitudinal fold lines and the top of the lid, whereby the first corner segment is between the at least two attachment segments. Such attachment may for example result from application of glue with a glue gun prior to folding the layers onto each other and prior to forming the corner segment by folding.

In some examples, the internal or external paperboard or cardboard layer according to this disclosure is a plain board layer or a corrugated fiber board layer. In some examples, the paperboard or cardboard layer according to this disclosure is made from plain board comprising recycled content with a gsm (grams per square meter) range between 300 and 900, preferably between 500 and 700. In some examples, the paperboard or cardboard layer according to this disclosure is made from virgin plain board, or free from recycled content, with a gsm (grams per square meter) range between 250 and 600, preferably between 300 and 500.

Figure 6:
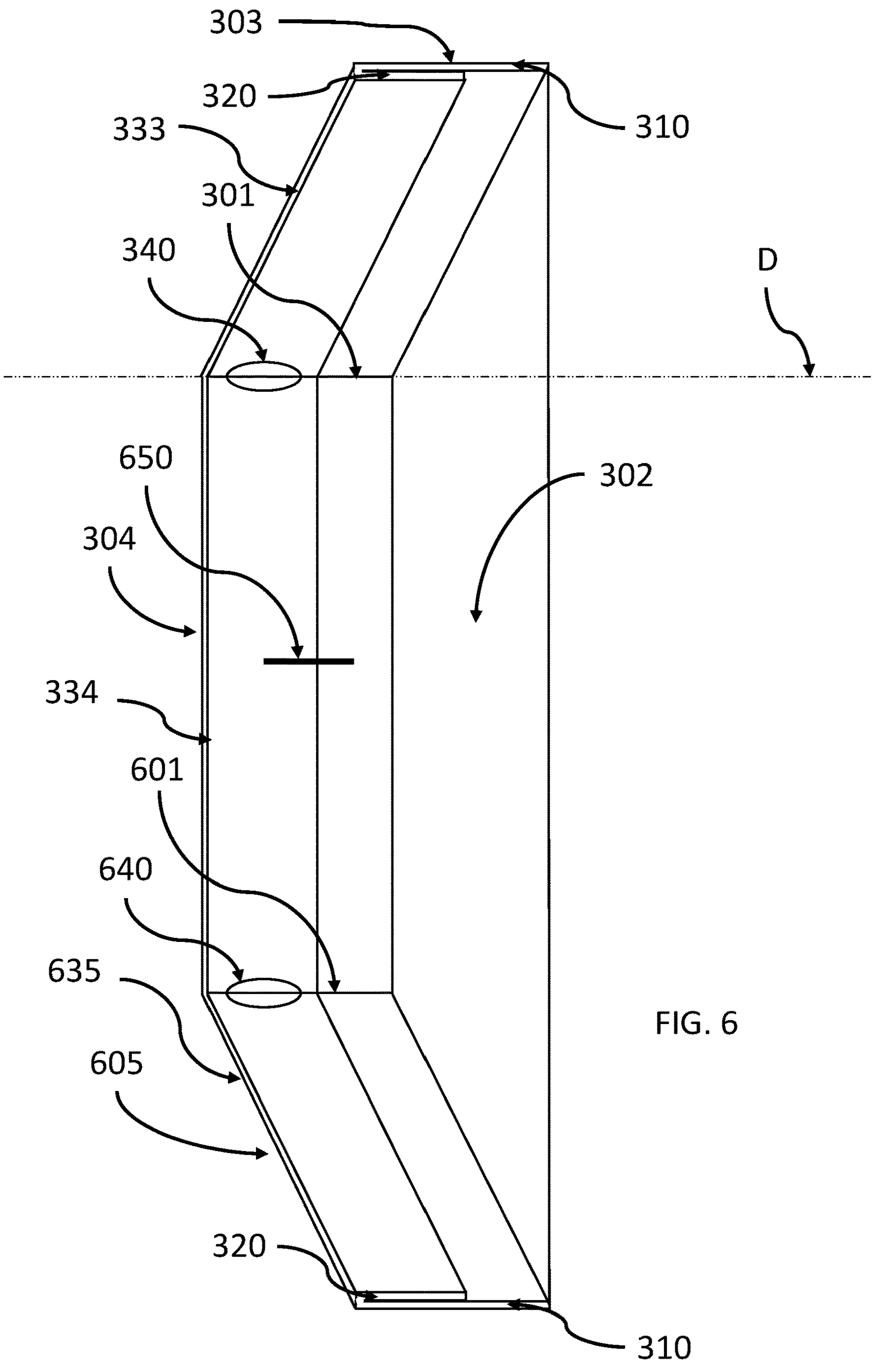
FIG. 6 illustrates example corners of an example lid.

In some examples, in particular as illustrated in FIG. 6, which is based on the example represented in FIG. 3B with a view along a plane such as plane S2 instead of plane S of FIG. 1A and thereby illustrating two corners of the example lid, the lid being in this example illustrated on the side, the container comprising a third flank 605, whereby the second 304 and the third 605 flanks intersect at a second corner segment 601 along a direction parallel to the corner direction D, the second corner segment comprising the first external layer 310 folded along the direction parallel to the direction parallel to the corner direction and the first internal layer 320 folded along the direction parallel to the corner direction, whereby the first external layer overlaps the first internal layer at the second corner segment 601, whereby the first external layer is connected to the first internal layer along a third longitudinal fold line 635 parallel to the third flank, the third longitudinal fold line defining a distal end of the third flank away from the top 302, whereby the first external layer is a continuous layer at the second corner segment and whereby the first internal layer comprises a second cutout shape 640 at the second corner segment, whereby the second cutout shape is elongated along the second corner segment, whereby the second cutout shape terminates more than 0.5 cm away from the second and third longitudinal fold lines, whereby the second cutout shape has a maximum total span, along the second and third flanks and in a plane parallel to the top, of at least 0.3 mm, preferably of at least 2 mm, and whereby the second cutout shape has a length of less than 90% and of more than 10% of a height of the first internal layer along the second corner segment. Providing such plurality of cutout shapes permits providing a plurality of reinforced corners in a same lid according to this disclosure.

As illustrated in FIG. 6, the first internal layer and the first external layer may be attached to each other by a staple 650 situated between the longitudinal fold lines and the top of the lid.

The second cutout shape may vary in its characteristics as described in the context of the first cutout shape. In some example embodiments, the first and the second cutout shapes are the same. In some example embodiments, the first and the second cutout shapes are different.

Figure 7A:
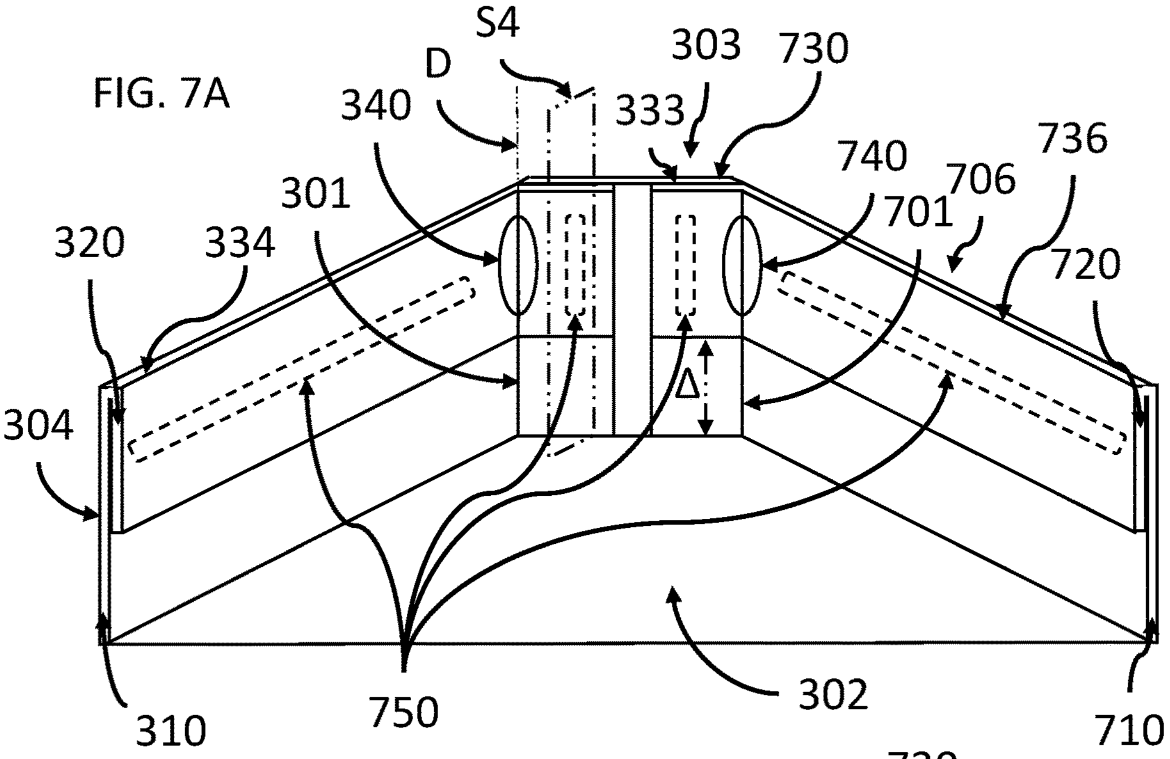
FIG. 7A-B illustrate other example corners of an example lid.
Figure 7B:
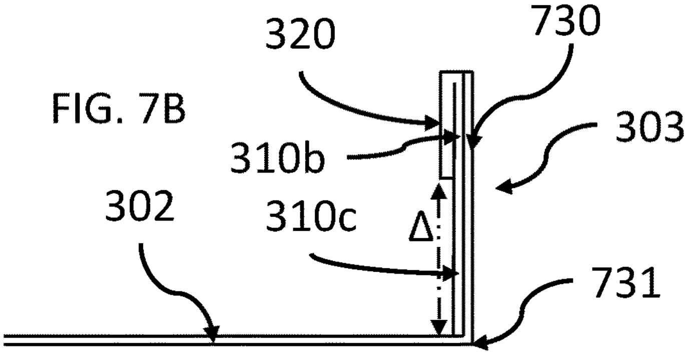

FIG. 7A illustrates another example container, FIG. 7A being based on the example represented in FIG. 6 with a view along a plane such as plane S3 of FIG. 1A, the container comprising at least a fourth flank 706, whereby the first 303 and the fourth 706 flanks intersect at a third corner segment 701 along a direction parallel to the corner direction D, the third corner segment comprising a second external paperboard or cardboard layer 710 folded along the direction parallel to the direction parallel to the corner direction and a second internal paperboard or cardboard layer 720 folded along the direction parallel to the corner direction, whereby the second external layer overlaps the second internal layer at the third corner segment 701, whereby the second external layer is connected to the second internal layer along the first longitudinal fold line 333 and along a fourth longitudinal fold line 736 parallel to the fourth flank, the fourth longitudinal fold line defining a distal end of the fourth flank away from the top 302, whereby the second external layer is a continuous layer at the third corner segment and whereby the second internal layer comprises a third cutout shape 740 at the third corner segment, whereby the third cutout shape is elongated along the second corner segment, whereby the third cutout shape terminates more than 0.5 cm away from the first and fourth longitudinal fold lines, whereby the third cutout shape has a maximum total span, along the first and fourth flanks and in a plane parallel to the top, of at least 0.3 mm, preferably of at least 2 mm, and whereby the third cutout shape has a length of less than 90% and of more than 10% of a height of the second internal layer along the third corner segment.

As illustrated in FIG. 7A, the first internal layers 320 and 720 and the first external layers 310 and 710 may be respectively attached to each other along a plurality if attachment segments 750 situated between the longitudinal fold lines and the top of the lid, whereby each corner segment is between at least two attachment segments. As illustrated in FIG. 5, such attachments may for example result from application of glue with a glue gun prior to folding the respective layers onto each other and prior to forming the different corner segments by folding.

The third cutout shape may vary in its characteristics as described in the context of the first or second cutout shapes. In some example embodiments, the first, second and third cutout shapes are the same. In some example embodiments, the first, second and third cutout shapes are different.

While not described here in details, a fourth (or even further additional) lid corners may be provided, such as for example corner 123 of FIG. 1A.

A first flank as per any of the examples hereby described, and in particular as represented in FIG. 7A (FIG. 7A being complemented by section view FIG. 7B along plane S4, illustrated in FIG. 7A, plane S4 being parallel to the second flank 304), comprises a first major flap 730, a first major flap folding line 731 connecting the first major flap to the top 302, whereby part 310*b* of the first external layer is sandwiched between the first major flap 730 and the first internal layer 320 to form part of the first flank 303. Providing a first major flap permits further reinforcement of the lid. While numerous configurations may be provided, a specific example blank view 7C is provided for an example lid presenting such a major flap, and four lid corners according to this disclosure. In some examples, not illustrated here, the first internal layer is sandwiched between the major flap and the first external layer, whereby the major flap would be closer to the corresponding box sidewall than the first internal layer when the lid is closed.

As illustrated for example in FIG. 2B, in some examples the top of the lid is rectangular, whereby the second flank, in this example flank 230, is longer than the first flank, in this example either flank 231 or flank 232, whereby the lid is symmetrical along a plane parallel to the second flank. In such a configuration, the lid may for example comprise one cutout at each corner. An advantage of the symmetry of such a lid is that such lid may be placed onto the box in a reversible manner.

Figure 7C:
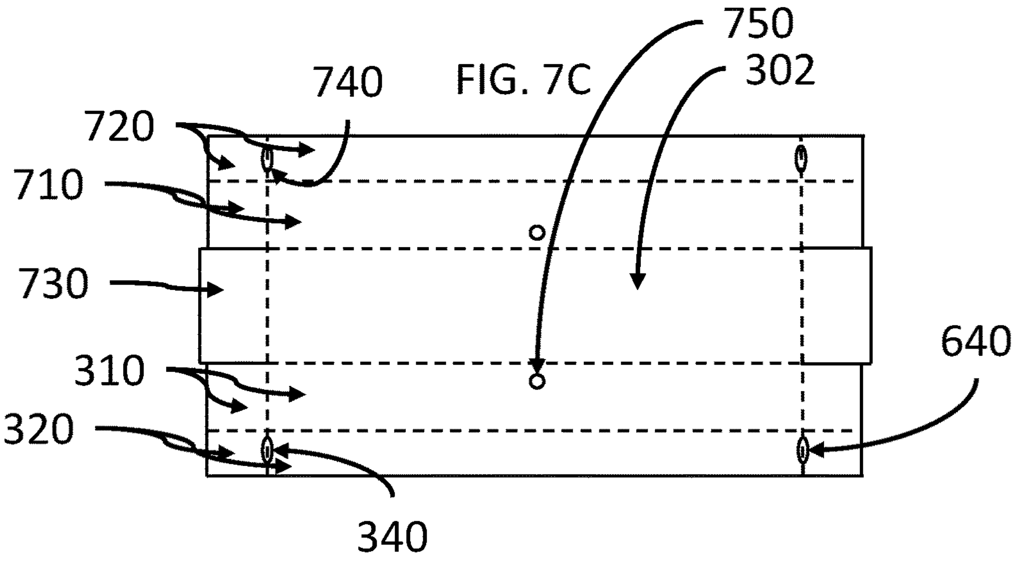
FIG. 7C illustrate an example blank of the example lid of FIGS. 7A-B.

In some examples, as illustrated for example in FIGS. 3B, 5, 6, 7A and 7B, the first internal layer forms an abutment tab of the lock, such first internal cardboard layer providing both a locking and a reinforcing function. In such examples, the first internal layer is shorter than the first external layer along a direction parallel to the corner direction in at least a specific portion of the second flank such as example specific portion 310*c* represented in FIG. 7B. In such configurations, the specific portion of the second flank may comprise an actuation area of the lock, such actuation area being for example an aperture such as aperture 750 illustrated in FIG. 7C.

Figure 8:
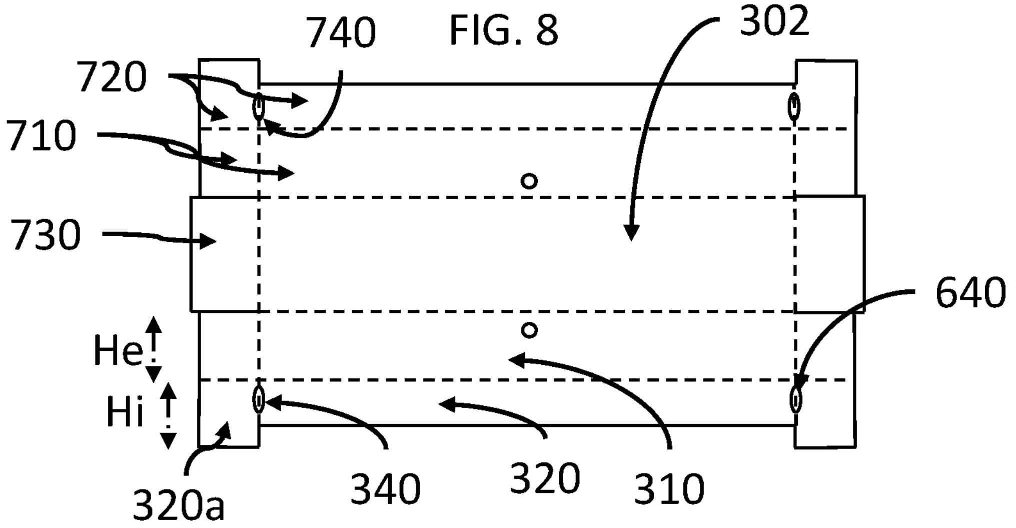
FIG. 8 illustrates another example blank of an example lid.

In some examples, as illustrated by the blank of FIG. 8 (similar to the blank of FIG. 7C), the first internal layer 320 has a same height Hi as a height He of the first external layer along a direction parallel to the corner direction in at least a first portion 320*a* of the first flank. Such a configuration leads to suppressing, along such portion, a discontinuity such as discontinuity Δ generated by such height difference. Such equal height configuration may apply to a selection of the flanks or to all flanks. In FIG. 8, the resulting two short flanks would have a same internal and external layer height, while the resulting two long flanks would present a discontinuity which in this case permits, in each long flank, providing a locking tab and an actuation area. In some examples not represented here, the lid may further comprise a support element affixed to the top panel, whereby a sidewall of the box would be sandwiched between the support element and the corresponding flank of the lid, thereby providing further robustness, as described for example in EP22167961.6, filed on Apr. 12, 2022.

The present disclosure aims at resolving the apparent contradiction between, on one hand, the use of materials for the container which would resist accidental opening, and the use of materials for the container which are particularly environmentally friendly.

The container may be made from rigid paperboard or cardboard material, flexible paperboard or cardboard material or a mixture thereof. In some example, the layer material forming the box or the lid has a wall thickness of more than 300 microns and of less than 6 mm per layer. In some example, the layer material forming the box or the lid has a wall thickness of more than 1 mm and of less than 2 mm per layer. The container may be made from paper materials, bio based material, bamboo fibres, cellulose fibres, cellulose based or fibre based materials, or a mixture thereof. The container may be made from materials comprising recycled materials, for example recycled cellulose fiber based materials. In some examples, the container is made from C (3.2 mm) flute corrugated cardboard. In some examples, the container is made from double wall cardboard, in some example made from double wall cardboard up to 5 mm thick per double wall layer.

In some examples the flanks of the lid cover about 30% of the sidewalls of the box, 30% corresponding in this case to a ratio between on one hand a height of the flanks in a direction normal to both the top of the lid and the base of the box and on the other hand the height of the sidewalls in the direction normal to both the top of the lid and the base of the box. In an example, the flanks completely surround the sidewalls around the opening. Such coverage of the flanks participates in ensuring lid placement, structural resiliency and protection of the content. In some examples, the flanks cover at least 50% of the sidewalls when the lid is in the closed position. In some examples, the flanks cover at least 75% of the sidewalls when the lid is in the closed position. In some examples, the flanks cover at least 90% of the sidewalls when the lid is in the closed position. In some examples, the flanks cover 100% of the sidewalls when the lid is in the closed position. Increasing flank coverage increases robustness. In some examples, the flanks cover at most 90% of the sidewalls when the lid is in the closed position. In some examples, the flanks cover at most 80% of the sidewalls when the lid is in the closed position. In some examples, the flanks cover at most 70% of the sidewalls when the lid is in the closed position. Decreasing flank coverage can ease opening of the container by providing grip surface on both the lid and the box sidewalls. In some examples, a manufacturing process comprises providing different box sizes, for example boxes having a sidewall height of either 10 cm, 11.5 cm, 13.5 cm or 16 cm, whereby each box may be provided with a same lid fitting all box sizes provided, such as a lid having a flank height of 7 cm. In some examples, flank height is of more than 3 cm. In some examples, flank height is of more than 5 cm. In some examples, flank height is of more than 6 cm. In some examples, flank height is of 9 cm or more. In some examples, flank height is of 12 cm or more. In some examples, sidewalls of the box have a sidewall height along a direction perpendicular to the base of 30 cm or more. In some examples, sidewalls of the box have a sidewall height along a direction perpendicular to the base of up to 40 cm.

The present disclosure further provides a consumer product comprising a detergent product and a container according to any of examples hereby described, whereby the box comprises the detergent product.

A consumer product should in this disclosure be understood as a product which is provided, among others, to end consumers. Such consumer products may for example be available for purchase in supermarkets and end consumers may store such consumer products in their homes. Consumer products may be provided in large quantities and should thereby be designed taking environmental concerns into account. Consumer products should also be designed taking transportation to a retail store into account. Consumer products should also be designed taking on the shelf storage in a retail store into account. Consumer products should also be designed taking transportation from a retail store to a consumer home into account. Consumer products should also be designed taking storage at a private end consumer home into account. Consumer products should also be designed taking use of the consumer product at a private end consumer home into account. Consumer products should also be designed taking disposal into account.

The consumer product according to this disclosure comprises a detergent product. Detergent products should be understood in this disclosure as products comprising a surfactant. Detergent products may also comprise a bleach or other ingredients. Example detergent product compositions are described in more detail herein. In some examples, the detergent product comprises unit dose detergent pouches, preferably water soluble unit dose detergent pouches, more preferably flexible water soluble unit dose detergent pouches. Example unit dose detergent pouches are described in more detail herein.

In some examples, the consumer product comprises at least one water-soluble unit dose article and the container. The consumer product can be sold 'as is', in other words the consumer product is the item that the consumer picks up from the shelf. Alternatively, the consumer product could be housed as one unit of a multi-component product. For example, more than one consumer product could be housed within an outer package and the multiple packaged consumer products sold together in a single purchase. The consumer product may comprise aesthetic elements, for example shrink sleeves or labels attached to the container. Alternatively, the container may be coloured or printed with aesthetic elements or informative print such as usage instructions.

In some examples a water-soluble unit dose article comprises at least one water-soluble film orientated to create at least one-unit dose internal compartment, wherein the at least one-unit dose internal compartment comprises a detergent composition. The water-soluble film and the detergent composition are described in more detail below. In some examples the consumer product comprises at least one water-soluble unit dose article, in some cases at least two water-soluble unit dose articles, in some cases at least 10 water-soluble unit dose articles, in some cases at least 20 water-soluble unit dose articles, in some cases at least 30 water-soluble unit dose articles, in some cases at least 40 water-soluble unit dose articles, in some cases at least 45 water-soluble unit dose articles. A water-soluble unit dose article is in some examples in the form of a pouch. A water-soluble unit dose article comprises in some examples a unitary dose of a composition as a volume sufficient to provide a benefit in an end application. The water-soluble unit dose article comprises in some examples one water-soluble film shaped such that the unit-dose article comprises at least one internal compartment surrounded by the water-soluble film. The at least one compartment comprises a cleaning composition. The water-soluble film is sealed such that the cleaning composition does not leak out of the compartment during storage. However, upon addition of the water-soluble unit dose article to water, the water-soluble film dissolves and releases the contents of the internal compartment into the wash liquor. The unit dose article may comprise more than one compartment, at least two compartments, or at least three compartments, or at least four compartments, or even at least five compartments. The compartments may be arranged in superposed orientation, i.e. one positioned on top of the other. Alternatively, the compartments may be positioned in a side-by-side orientation, i.e. one orientated next to the other. The compartments may be orientated in a 'tyre and rim' arrangement, i.e. a first compartment is positioned next to a second compartment, but the first compartment at least partially surrounds the second compartment, but does not completely enclose the second compartment. Alternatively, one compartment may be completely enclosed within another compartment. In some examples the unit dose article comprises at least two compartments, one of the compartments being smaller than the other compartment. In some examples the unit dose article comprises at least three compartments, two of the compartments may be smaller than the third compartment, and in some examples the smaller compartments being superposed on the larger compartment. The superposed compartments are in some examples orientated side-by-side. In some examples each individual unit dose article may have a weight of between 10 g and 40 g, or even between 15 g and 35 g. The water soluble film may be soluble or dispersible in water. Prior to be being formed into a unit dose article, the water-soluble film has in some examples a thickness of from 20 to 150 micron, in other examples 35 to 125 micron, in further examples 50 to 110 micron, in yet further examples about 76 micron. Example water soluble film materials comprise polymeric materials. The film material can, for example, be obtained by casting, blow-moulding, extrusion or blown extrusion of the polymeric material. In some examples, the water-soluble film comprises polyvinyl alcohol homopolymer or polyvinyl alcohol copolymer, for example a blend of polyvinylalcohol homopolymers and/or polyvinylalcohol copolymers, for example wherein the polyvinyl alcohol copolymers are selected from sulphonated and carboxylated anionic polyvinylalcohol copolymers especially carboxylated anionic polyvinylalcohol copolymers, for example the water-soluble comprises a blend of a polyvinylalcohol homopolymer and a carboxylated anionic polyvinylalcohol copolymer, or alternatively a blend of polyvinyl alcohol homopolymers. Alternatively the polyvinyl alcohol in the water-soluble film consists of an anionic polyvinylalcohol copolymer, especially a carboxylated polyvinylalcohol copolymer. In some examples water soluble films are those supplied by Monosol under the trade references M8630, M8900, M8779, M8310. In some examples the film may be opaque, transparent or translucent. The film may comprise a printed area. The area of print may be achieved using techniques such as flexographic printing or inkjet printing. The film may comprise an aversive agent, for example a bittering agent. Suitable bittering agents include, but are not limited to, naringin, sucrose octaacetate, quinine hydrochloride, denatonium benzoate, or mixtures thereof. Example levels of aversive agent include, but are not limited to, 1 to 5000 ppm, 100 to 2500 ppm, or 250 to 2000 ppm. The water-soluble film or water-soluble unit dose article or both may be coated with a lubricating agent. In some examples, the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

In some examples the container comprises a first part, wherein the first part comprises a first compartment in which the at least one water-soluble unit dose article is contained. In some examples the first compartment comprises at least two water-soluble unit dose articles. The first compartment may comprise between 1 and 80 water-soluble unit dose articles, between 1 and 60 water-soluble unit dose articles, between 1 and 40 water-soluble unit dose articles, or between 1 and 20 water-soluble unit dose articles. The volume of the first compartment may be between 500 ml and 5000 ml, in some examples between 800 ml and 4000 ml.

In some examples the detergent product comprises a detergent composition. The detergent composition may be a laundry detergent composition, an automatic dishwashing composition, a hard surface cleaning composition, or a combination thereof. The detergent composition may comprise a solid, a liquid or a mixture thereof. The term liquid includes a gel, a solution, a dispersion, a paste, or a mixture thereof. The solid may be a powder. By powder we herein mean that the detergent composition may comprise solid particulates or may be a single homogenous solid. In some examples, the powder detergent composition comprises particles. This means that the powder detergent composition comprises individual solid particles as opposed to the solid being a single homogenous solid. The particles may be free-flowing or may be compacted. A laundry detergent composition can be used in a fabric hand wash operation or may be used in an automatic machine fabric wash operation, for example in an automatic machine fabric wash operation. Example laundry detergent compositions comprise a non-soap surfactant, wherein the non-soap surfactant comprises an anionic non-soap surfactant and a non-ionic surfactant. In some examples, the laundry detergent composition comprises between 10% and 60%, or between 20% and 55% by weight of the laundry detergent composition of the non-soap surfactant. Example weight ratio of non-soap anionic surfactant to nonionic surfactant are from 1:1 to 20:1, from 1.5:1 to 17.5:1, from 2:1 to 15:1, or from 2.5:1 to 13:1. Example non-soap anionic surfactants comprises linear alkylbenzene sulphonate, alkyl sulphate or a mixture thereof. Example weight ratio of linear alkylbenzene sulphonate to alkyl sulphate are from 1:2 to 9:1, from 1:1 to 7:1, from 1:1 to 5:1, or from 1:1 to 4:1. Example linear alkylbenzene sulphonates are $C_{10}$-$C_{16}$ alkyl benzene sulfonic acids, or $C_{11}$-$C_{14}$ alkyl benzene sulfonic acids. By 'linear', we herein mean the alkyl group is linear. Example alkyl sulphate anionic surfactant may comprise alkoxylated alkyl sulphate or non-alkoxylated alkyl sulphate or a mixture thereof. Example alkoxylated alkyl sulphate anionic surfactant comprise an ethoxylated alkyl sulphate anionic surfactant. Example alkyl sulphate anionic surfactant may comprise an ethoxylated alkyl sulphate anionic surfactant with a mol average degree of ethoxylation from 1 to 5, from 1 to 3, or from 2 to 3. Example alkyl sulphate anionic surfactant may comprise a non-ethoxylated alkyl sulphate and an ethoxylated alkyl sulphate wherein the mol average degree of ethoxylation of the alkyl sulphate anionic surfactant is from 1 to 5, from 1 to 3, or from 2 to 3. Example alkyl fraction of the alkyl sulphate anionic surfactant are derived from fatty alcohols, oxo-synthesized alcohols, Guerbet alcohols, or mixtures thereof. In some examples, the laundry detergent composition comprises between 10% and 50%, between 15% and 45%, between 20% and 40%, or between 30% and 40% by weight of the laundry detergent composition of the non-soap anionic surfactant. In some examples, the non-ionic surfactant is selected from alcohol alkoxylate, an oxo-synthesised alcohol alkoxylate, Guerbet alcohol alkoxylates, alkyl phenol alcohol alkoxylates, or a mixture thereof. In some examples, the laundry detergent composition comprises between 0.01% and 10%, between 0.01% and 8%, between 0.1% and 6%, or between 0.15% and 5% by weight of the liquid laundry detergent composition of a non-ionic surfactant. In some examples, the laundry detergent composition comprises between 1.5% and 20%, between 2% and 15%, between 3% and 10%, or between 4% and 8% by weight of the laundry detergent composition of soap, in some examples a fatty acid salt, in some examples an amine neutralized fatty acid salt, wherein in some examples the amine is an alkanolamine for example selected from monoethanolamine, diethanolamine, triethanolamine or a mixture thereof, in some examples monoethanolamine. In some examples, the laundry detergent composition is a liquid laundry detergent composition. In some examples the liquid laundry detergent composition comprises less than 15%, or less than 12% by weight of the liquid laundry detergent composition of water. In some examples, the laundry detergent composition is a liquid laundry detergent composition comprising a non-aqueous solvent selected from 1,2-propanediol, dipropylene glycol, tripropyleneglycol, glycerol, sorbitol, polyethylene glycol or a mixture thereof. In some examples, the liquid laundry detergent composition comprises between 10% and 40%, or between 15% and 30% by weight of the liquid laundry detergent composition of the non-aqueous solvent. In some examples, the laundry detergent composition comprises a perfume. In some examples, the laundry detergent composition comprises an adjunct ingredient selected from the group comprising builders including enzymes, citrate, bleach, bleach catalyst, dye, hueing dye, brightener, cleaning polymers including alkoxylated polyamines and polyethyleneimines, soil release polymer, surfactant, solvent, dye transfer inhibitors, chelant, encapsulated perfume, polycarboxylates, structurant, pH trimming agents, and mixtures thereof. In some examples, the laundry detergent composition has a pH between 6 and 10, between 6.5 and 8.9, or between 7 and 8, wherein the pH of the laundry detergent composition is measured as a 10% product concentration in demineralized water at 20° C. When liquid, the laundry detergent composition may be Newtonian or non-Newtonian. In some examples, the liquid laundry detergent composition is non-Newtonian. Without wishing to be bound by theory, a non-Newtonian liquid has properties that differ from those of a Newtonian liquid, more specifically, the viscosity of non-Newtonian liquids is dependent on shear rate, while a Newtonian liquid has a constant viscosity independent of the applied shear rate. The decreased viscosity upon shear application for non-Newtonian liquids is thought to further facilitate liquid detergent dissolution. The liquid laundry detergent composition described herein can have any suitable viscosity depending on factors such as formulated ingredients and purpose of the composition.

Figure 9:
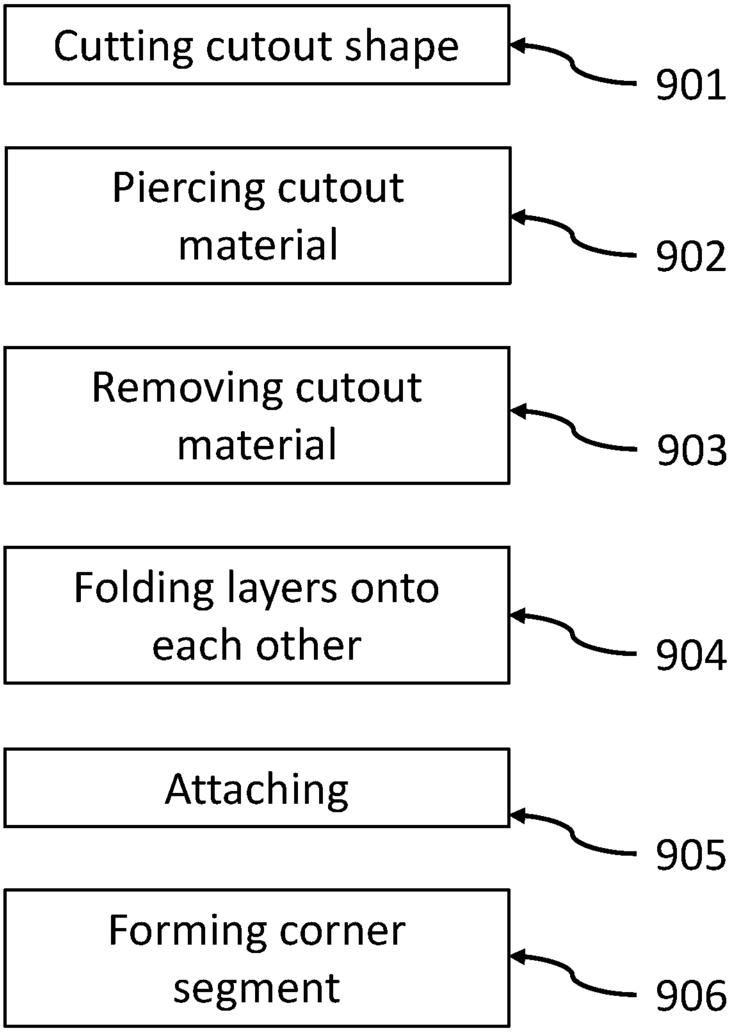
FIG. 9 illustrate an example method for manufacturing an example container.

FIG. 9 illustrates an example method for manufacturing a container according to any of the examples hereby described. Such example method comprises, in block 901, cutting, using a cutting rule of a die, the first cutout shape into the first internal layer. In some examples, during block 901, the first internal and first external layer are part of a same unfolded flat sheet, as illustrated in blanks of FIG. 7C or FIG. 8. The example method further comprises, in block 902, piercing, using one or more pins, a cutout material corresponding to the cutting of the first cutout shape. This avoids uncontrolled movement of the cutout material once cutout. One should note that such piercing 902 may occur prior to, after or during cutting 901. The example method further comprises, in block 903, entirely removing, using the one or more pins, the cutout material from the first internal layer. This permits avoiding accumulating cutout material debris on a manufacturing line. The example method further comprises, in block 904, folding the first external layer and the first internal layer onto each other along the first and the second longitudinal fold lines, whereby the first and the second longitudinal fold lines are aligned during the folding. This prepares the corresponding flanks. The method also comprises, in block 905, attaching the first external layer and the first internal layer onto each other. Such attachment may for example involve gluing, whereby glue may be applied onto one or both of the layers prior to the folding as per block 904. Such attachment may for example involve stapling once the folding as per block 904 has taken place. Such attachment may for example involve heat sealing once the folding as per block 904 has taken place, for example in cases whereby the internal and external layers comprise a superficial heat sealable layer. The example method further comprises, in block 906, forming the first corner segment by folding, along the corner direction, the attached first external layer and first internal layer, whereby the first internal layer is nested into the first external layer by the folding. This permits forming the reinforced corner without undue tension onto the first external layer. As a result of applying blocks 901-906, the first cutout shape is according to any of the examples hereby described, whereby the first cutout shape is elongated along the first corner segment, the first cutout shape terminates at least 0.5 cm away from the first and second longitudinal fold lines, the first cutout shape has a maximum total span, along the first and second flanks and in a plane parallel to the top, of at least 2 mm, and the first cutout shape has a length of less than 90% and of more than 10% of a height of the first internal cardboard layer along the first corner segment. In some examples, the forming of the first corner segment takes place around a removable mandrel inserted along the first portion of the first flank. In some examples, in order to avoid "catching" the mandrel, movement of the mandrel in a direction parallel to the corner direction is facilitated by providing a first internal paperboard or cardboard layer having a same height as the first external paperboard or cardboard layer along a direction parallel to the corner direction in at least a first portion of the first flank, as illustrated by blank 8, avoiding catching the mandrel onto an abutment tab. Such mandrel may also be used to fold a major flap such as major flap 730 described above.

Such example methods may be applied to one or more corner segments of any example containers hereby described.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

What is claimed is:

1. A container, the container comprising a box, a lid for the box, and a lock to maintain the lid in a closed position,
the box comprising a base, sidewalls and an opening opposite the base,
the lid comprising a top and flanks,
the top covering the opening and the flanks covering at least a portion of the sidewalls of the box when the lid is in the closed position,
whereby the flanks comprise at least a first and a second flank,
whereby the first and the second flanks intersect at a first corner segment along a corner direction normal to the top, the first corner segment comprising a first external layer folded along the corner direction and a first internal layer folded along the corner direction,
whereby the first external layer and the first internal layer are cardboard or paperboard,
whereby the first external layer overlaps the first internal layer at the first corner segment,
whereby the first external layer is connected to the first internal layer along a first longitudinal fold line parallel to the first flank and along a second longitudinal fold line parallel to the second flank, the first and the second longitudinal fold lines defining respective distal ends of the first and second flank away from the top,
whereby the first internal layer and the first external layer are attached to each other at least a point situated between the longitudinal fold lines and the top of the lid,
whereby the first external layer is a continuous layer at the first corner segment and whereby the first internal layer comprises a first cutout shape at the first corner segment,
whereby the first cutout shape is elongated along the first corner segment, whereby the first cutout shape terminates more than about 0.5 cm away from the first and second longitudinal fold lines, whereby the first cutout shape has a maximum total span, along the first and second flanks and in a plane parallel to the top, of at least about 0.3 mm, and whereby the first cutout shape has a length of less than about 90% and of more than about 10% of a height of the first internal layer along the first corner segment.

2. The container according to claim 1, whereby the first cutout shape comprises one or more of an apex or a vertex coinciding with the first corner segment.

3. The container according to claim 1, whereby the first cutout shape comprises one or more of an ellipse, an oval, a diamond, a half moon, an elongated bead, or a superposition of any of these.

4. The container according to claim 1, whereby the first cutout shape extends beyond a about 2 mm diameter profile.

5. The container according to claim 1, whereby the first external layer and the first internal layer comprise corrugated cardboard, the corrugated cardboard comprising flutes, the flutes running parallel to the corner direction.

6. The container according to claim 1, whereby the flanks comprise at least a third flank, whereby the second and the third flanks intersect at a second corner segment along a direction parallel to the corner direction, the second corner segment comprising the first external layer folded along the direction parallel to the corner direction and the first internal layer folded along the direction parallel to the corner direction, whereby the first external layer overlaps the first internal layer at the second corner segment, whereby the first external layer is connected to the first internal layer along a third longitudinal fold line parallel to the third flank, the third longitudinal fold line defining a distal end of the third flank away from the top, whereby the first external layer is a continuous layer at the second corner segment and whereby the first internal layer comprises a second cutout shape at the second corner segment, whereby the second cutout shape is elongated along the second corner segment, whereby the second cutout shape terminates more than about 0.5 cm away from the second and third longitudinal fold lines, whereby the second cutout shape has a maximum total span, along the second and third flanks and in a plane parallel to the top, of at least about 0.3 mm, and whereby the second cutout shape has a length of less than about 90% and of more than about 10% of a height of the first internal layer along the second corner segment.

7. The container according to claim 1, whereby the first flank comprises a first major flap, a first major flap folding line connecting the first major flap to the top, whereby part of the first external layer is sandwiched between the first major flap and the first internal layer to form part of the first flank.

8. The container according to claim 1, whereby the top of the lid is rectangular, whereby the second flank is longer than the first flank, and whereby the lid is symmetrical along a plane parallel to the second flank.

9. The container according to claim 1, whereby the first internal layer forms an abutment tab of the lock.

10. The container according to claim 1, whereby the first internal layer is shorter than the first external layer along a direction parallel to the corner direction in at least a specific portion of the second flank.

11. The container according to claim 1, whereby the first internal layer and the first external layer are attached to each other at least two points situated between the longitudinal fold lines and the top of the lid, whereby the first corner segment is between the at least two points.

12. The container according to claim 1, whereby the first internal layer has a same height as the first external layer along a direction parallel to the corner direction in at least a first portion of the first flank.

13. A consumer product comprising a detergent product and a container according to claim 1, whereby the box comprises the detergent product.

14. A method for manufacturing a container according to claim 12, the method comprising, in this order:

cutting, using a cutting rule of a die, the first cutout shape into the first internal layer;

piercing, using one or more pins, a cutout material corresponding to the cutting of the first cutout shape;

entirely removing, using the one or more pins, the cutout material from the first internal layer;

folding the first external layer and the first internal layer onto each other along the first and the second longitudinal fold lines, whereby the first and the second longitudinal fold lines are aligned during the folding;

attaching the first external layer and the first internal layer onto each other; and forming the first corner segment by folding, along the corner direction, the attached first external layer and first internal layer, whereby the first internal layer is nested into the first external layer by the folding.

15. The method according to claim 14 for manufacturing a container according to claim 12, whereby the forming of the first corner segment takes place around a removable mandrel inserted along the first portion of the first flank.

* * * * *